United States Patent [19]
Kern et al.

[11] Patent Number: 6,045,448
[45] Date of Patent: Apr. 4, 2000

[54] POWER-TRANSMITTING DRIVE ASSEMBLY WITH IMPROVED RESILIENT DEVICES

[75] Inventors: Robert D. Kern; Andrew B. Robson, both of Waukesha; Gerald C. Ruehlow, Oconomowoc, all of Wis.

[73] Assignee: Generac Power Systems, Inc., Waukesha, Wis.

[21] Appl. No.: 09/013,124

[22] Filed: Jan. 26, 1998

Related U.S. Application Data

[63] Continuation-in-part of application No. 08/789,695, Jan. 27, 1997, Pat. No. 5,797,540.

[51] Int. Cl.[7] .................................................. F16D 3/68
[52] U.S. Cl. ................................... 464/74; 464/73
[58] Field of Search .............................. 464/73, 74, 89, 464/104, 147

[56] References Cited

U.S. PATENT DOCUMENTS

| | | | |
|---|---|---|---|
| 1,455,637 | 5/1923 | McCord | 464/74 |
| 1,504,279 | 8/1924 | Spicer | 464/74 |
| 1,878,730 | 9/1932 | Sykes | 464/74 |
| 2,764,003 | 9/1956 | Croset | 464/74 |
| 2,931,094 | 4/1960 | Teerlink . | |
| 2,963,772 | 12/1960 | Niles, Sr. . | |
| 3,257,825 | 6/1966 | Croset | 464/74 |
| 3,429,700 | 2/1969 | Wiegand et al. . | |
| 3,620,044 | 11/1971 | Iatour | 464/74 |
| 3,675,750 | 7/1972 | Wright | 464/74 |
| 4,127,368 | 11/1978 | Langer . | |
| 4,307,584 | 12/1981 | Sandiumenge | 464/74 |
| 4,328,879 | 5/1982 | Tone | 464/74 |
| 4,795,402 | 1/1989 | Reichardt | 464/74 |

FOREIGN PATENT DOCUMENTS

| | | | |
|---|---|---|---|
| 1179828 | 5/1959 | France | 464/74 |
| 2075151 | 11/1981 | France | 464/74 |
| 2126690 | 3/1984 | United Kingdom | 464/74 |

*Primary Examiner*—Lynne H. Browne
*Assistant Examiner*—Greg Binda
*Attorney, Agent, or Firm*—Jansson, Shupe, Bridge & Munger, Ltd.

[57] ABSTRACT

A drive assembly couples a driving mechanism, e.g., an engine, and a driven mechanism, e.g., a generator, to one another. The assembly includes a transmission member having a plurality of inwardly projecting fingers and a coupling having a plurality of outwardly directed projections interdigitated with the fingers. The projections include first and second projections which define a notch between them. A finger extends into the notch, thereby forming first and second pockets between the finger and the first and second projections, respectively. In the improvement, the first and second resilient devices are received in the first and second pockets, respectively. Each resilient device includes at least one spur projecting from it to prevent substantial rotation of the device in its pocket. In a more specific embodiment, alternating pairs of resilient devices are made, respectively, of natural rubber for good shock absorption and Buna N for resisting the harmful effects of oil.

15 Claims, 5 Drawing Sheets

POWER-TRANSMITTING DRIVE ASSEMBLY WITH IMPROVED RESILIENT DEVICES

RELATED APPLICATION

This application is a continuation-in-part of application Ser. No. 08,/789,605 filed on Jan. 27, 1997, now U.S. Pat. No. 5,797,540.

FIELD OF THE INVENTION

This invention relates generally to machine elements and mechanisms and, more particularly, to rotary-to-rotary mechanical couplings.

BACKGROUND OF THE INVENTION

Transmitting mechanical power often involves a prime mover, e.g., a gasoline or diesel engine, coupled in some way to a driven load. All automobiles (as well as many other types of machines) have some means of transmitting mechanical power from an engine to the driving wheels.

One way of doing so is by using a mechanical transmission of the manual gear-shifting type whereby the engine is coupled to the load, such load being the weight of the vehicle "reflected" through the driving wheels and the transmission to the engine. Another way to transmit mechanical power is through an automatic transmission of the torque-converter type. But these exemplary transmissions all include some device or mechanism, e.g., a manually-operated clutch, to cushion the flow of power as well as to wholly disconnect the engine and the load from one another. In other types of transmissions which are less well known (at least to the public generally), mechanical power is transmitted through some sort of coupling by which the prime mover and the load are always connected to one another. And such couplings are available in either rigid types or in "cushioned" types, the latter being configured to reduce shock during starting, running and stopping.

A specific type of engine-generator set is an example of a machine in which the prime mover and the load are always connected to one another. Exemplary uses for engine-generator sets include providing standby power for hospitals and providing day-to-day on-site power at remote construction sites.

In one arrangement for transmitting mechanical power from an engine to a generator, the engine output shaft has a transmission member connected to it. Such transmission member has radially-inwardly-extending fingers that may be said to "interdigitate" with radially-outwardly-extending projections of a coupling connected to the generator shaft. A separate round, resilient plug is placed between each finger and the adjacent projections to absorb shock and vibration as power is being transmitted from the engine to the generator.

While this arrangement has been generally satisfactory for its intended purpose, some modest shortcomings have been noted. For example, the resilient plugs tend to rotate about their own center axes and as a result, a particular finger and projection do not always contact the same surface of the plug.

Another shortcoming is that all of the plugs are made of the same material which, over time, is attacked by petroleum-based oil. Yet another shortcoming is that the degree of shock absorbency is less than optimum.

A new power-transmitting drive assembly which addresses such shortcomings would be a significant advance in the art.

OBJECTS OF THE INVENTION

An object of the invention is to provide a new power-transmitting drive assembly which overcomes some of the problems and shortcomings of the prior art.

Another object of the invention is to provide a new power-transmitting drive assembly in which the fingers and projections bear against the same surface of the resilient device.

Yet another object of the invention is to provide a new power-transmitting drive assembly which provides better shock absorption.

Another object of the invention is to provide a new power-transmitting drive assembly which resists the deleterious effects of petroleum-based lubricants. How these and other objects are accomplished will become more apparent from the following descriptions and from the drawings.

SUMMARY OF THE INVENTION

The invention involves a drive assembly for coupling a driving mechanism, e.g., an internal combustion engine, and a driven mechanism, e.g., an electrical generator, to one another. The assembly includes an outer, ring-like transmission member having a plurality of inwardly projecting fingers. It also includes a star-wheel-like inner coupling having a plurality of outwardly directed projections. Both the transmission member and the coupling rotate about the same axis of rotation.

The radially outwardly directed projections include first and second projections which define a relatively wide (measured circumferentially) notch between them and such notch is also referred to as a "first notch." A finger of the transmission member (also referred to as a "first finger") extends radially inwardly into the notch. Because the finger is significantly narrower (also measured circumferentially) than the notch, first and second spaces or pockets are formed between the finger and the first and second projections, respectively.

In the improvement, first and second resilient devices are received in the first and second pockets, respectively. The first and second resilient devices each include at least one somewhat-pointed spur projecting from it. In a highly preferred embodiment, each resilient device includes a pair of spurs projecting from it and measured along an axis through the center point of the device, the spurs are about 180° apart. That is, the spurs are coincident with such axis. The spurs bear against the transmission member or the coupling and prevent substantial rotation of the first and second resilient devices in their respective pockets.

In a more specific aspect of the invention, the first and second resilient devices are made of the same material. For specific driving and driven mechanisms, the material is selected from a group of materials consisting of natural rubber and nitrile Buna N.

Where the driving and driven mechanisms comprise an engine and a generator, respectively, rubber (particularly natural rubber) provides very good shock absorption. But natural rubber deteriorates when in contact with petroleum-based lubricants. In a highly preferred embodiment further described below, both natural rubber and nitrile Buna N are used for the resilient devices.

In other aspects of the invention, the coupling projections include a third projection which cooperates with the second projection to define a second notch between them. A second finger extends into the second notch.

The second finger and the second and third projections form third and fourth pockets. Third and fourth resilient devices are received in the third and fourth pockets, respectively. The first and second resilient devices are made of a first material (rubber or Buna N) and the third and fourth resilient devices are made of a second material (Buna N or rubber).

In a highly preferred embodiment, each of the coupling projections has a pair of curved sides and a separate resilient device is against each side of each projection. As to any one of the projections, the resilient devices against each side thereof are made of differing materials. And more specifically, the resilient devices in the drive assembly have substantially the same hardness. A preferred range of hardness is 60 to 80 Durometer and, most preferred, 70 plus or minus 5 Durometer.

Other details of the invention are set forth in the following detailed description and in the drawings.

DETAILED DESCRIPTIONS OF PREFERRED EMBODIMENTS

Figure 1:
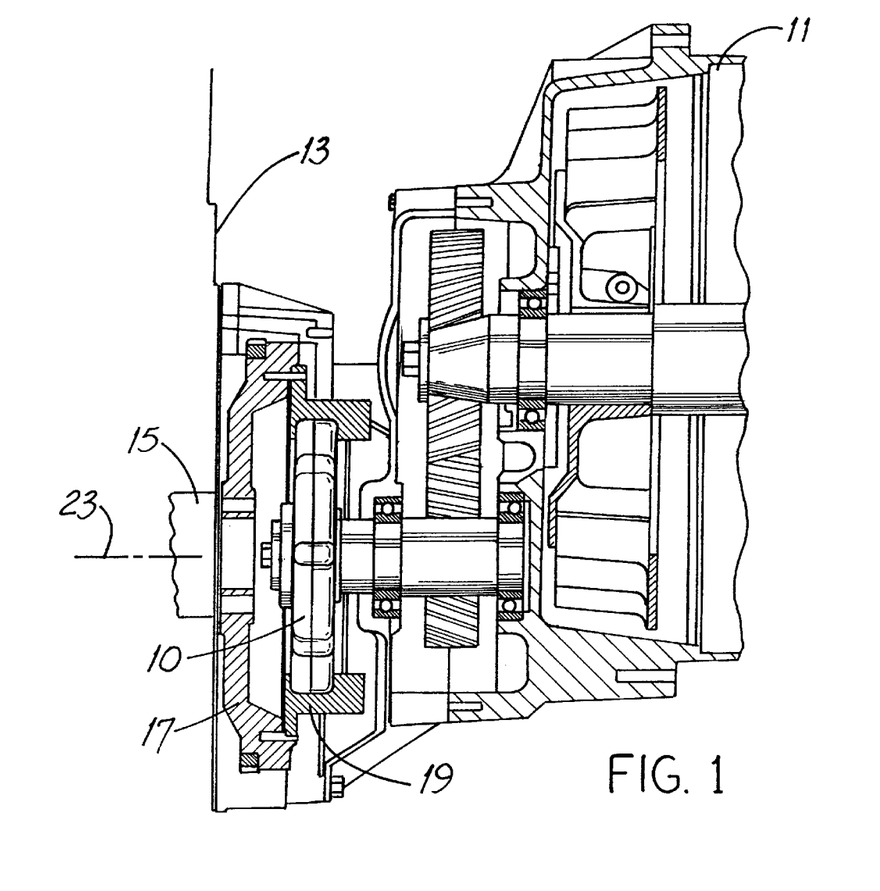
FIG. 1 is an elevation view, partly in section and partly in full representation, showing an exemplary application for the new drive assembly, i.e., a prime mover driving an electric generator.
Figure 2:
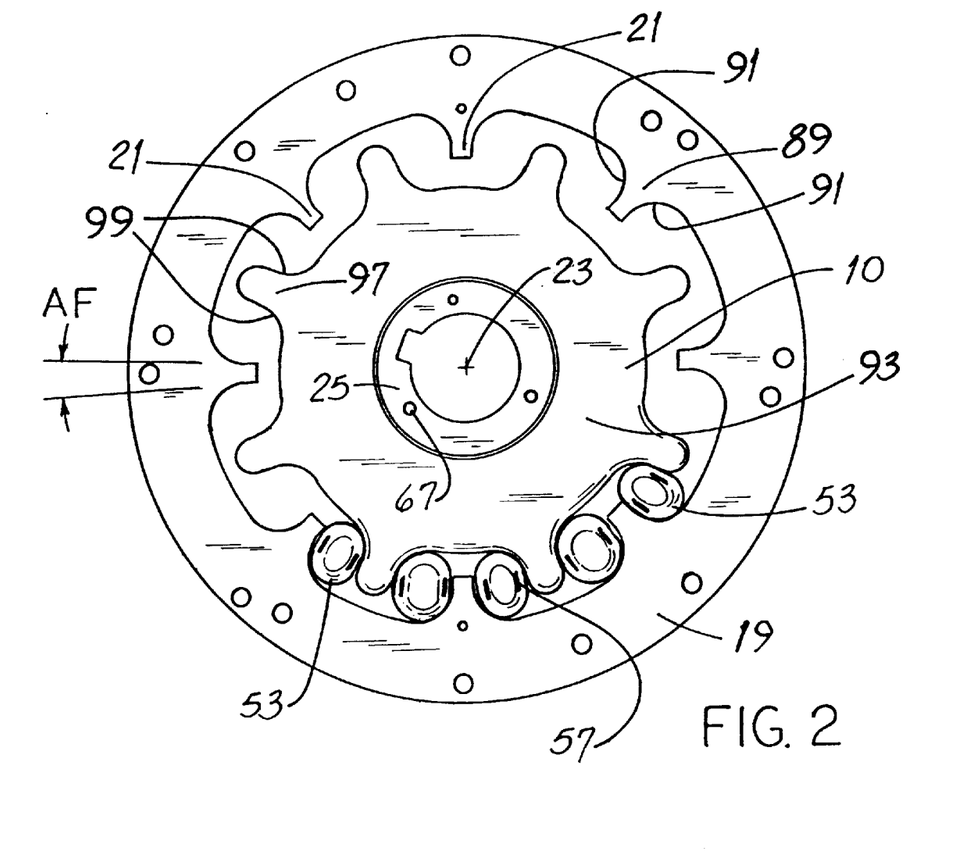
FIG. 2 is an axial view of one embodiment of a drive assembly comprising the new coupling and a transmission member used to transmit mechanical power to the coupling.
Figure 3:
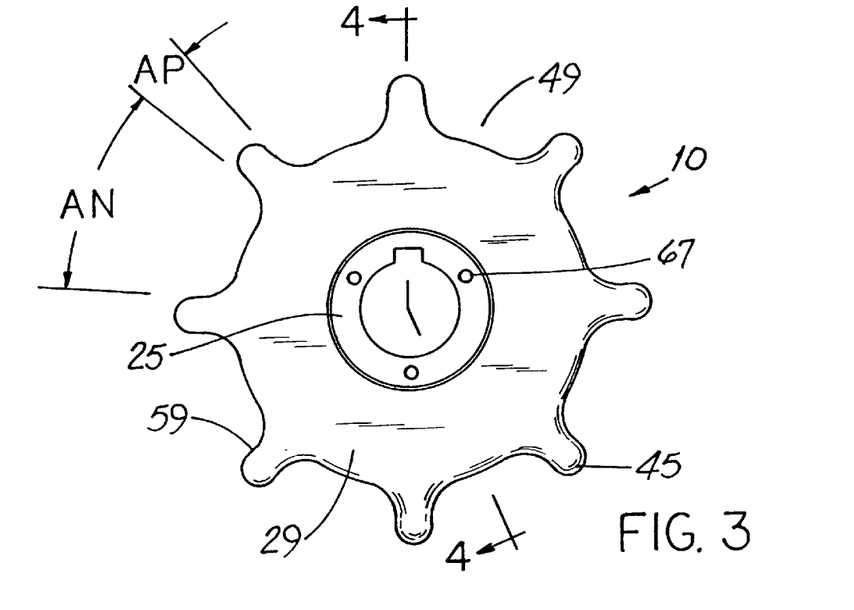
FIG. 3 is an elevation view of the new coupling.
Figure 4:
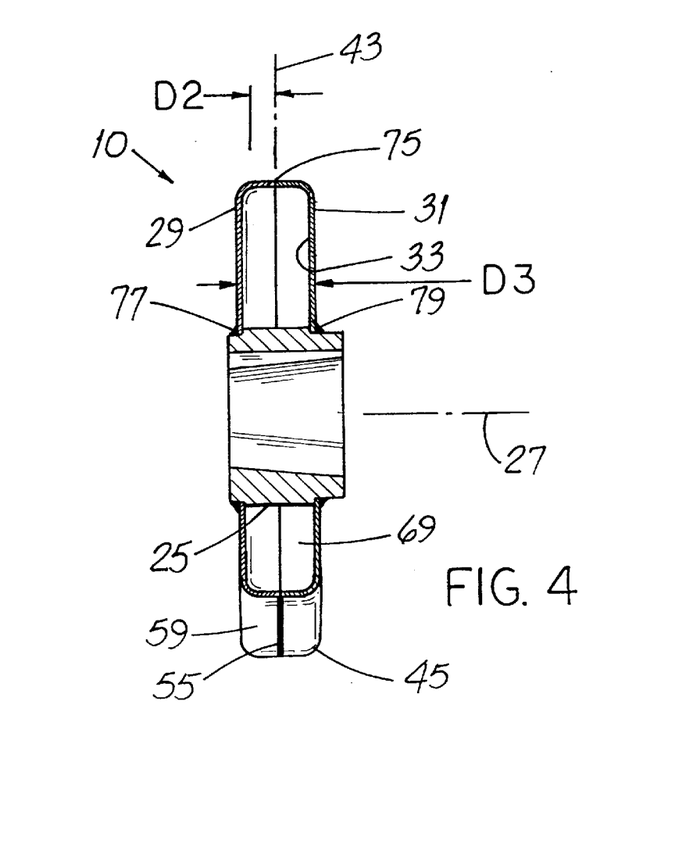
FIG. 4 is a sectional view of the new coupling taken along the section 4—4 of FIG. 3.

Before describing the new power-transmitting coupling 10 and method for making such coupling 10, it will be helpful to have an understanding of one way in which the new coupling 10 may be used. Referring to FIGS. 1 and 2, a generator 11 is driven by a prime mover 13 such as an internal combustion engine. Mechanical power is transmitted from the engine output shaft 15 to a flywheel 17 and thence to a ring-like transmission member 19 coupled to the flywheel 17.

The transmission member 19 has plural fingers 21 extending radially inwardly toward the axis of rotation 23. Measured radially (i.e., in degrees), the fingers 21 are spaced equidistant from one another. In a specific embodiment, there are eight fingers 21 and the angle of spacing between each adjacent pair of fingers 21 is 45°.

Figure 5:
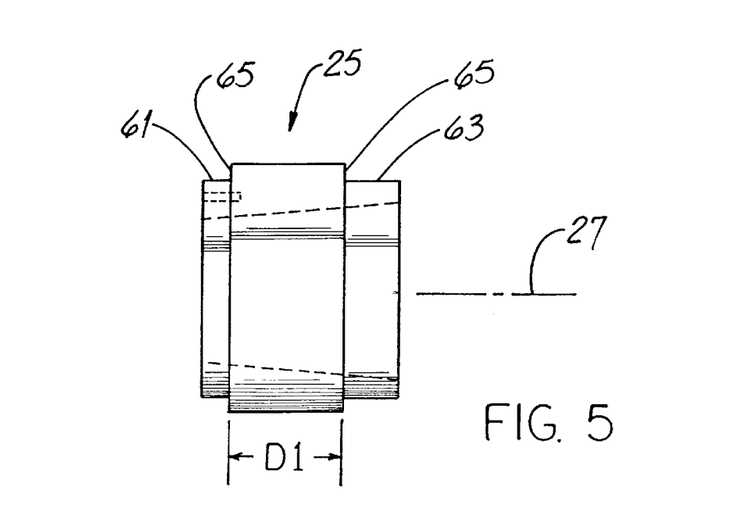
FIG. 5 is an elevation view of the drive hub portion of the new coupling. Certain surfaces are shown in dashed outline.
Figure 6:
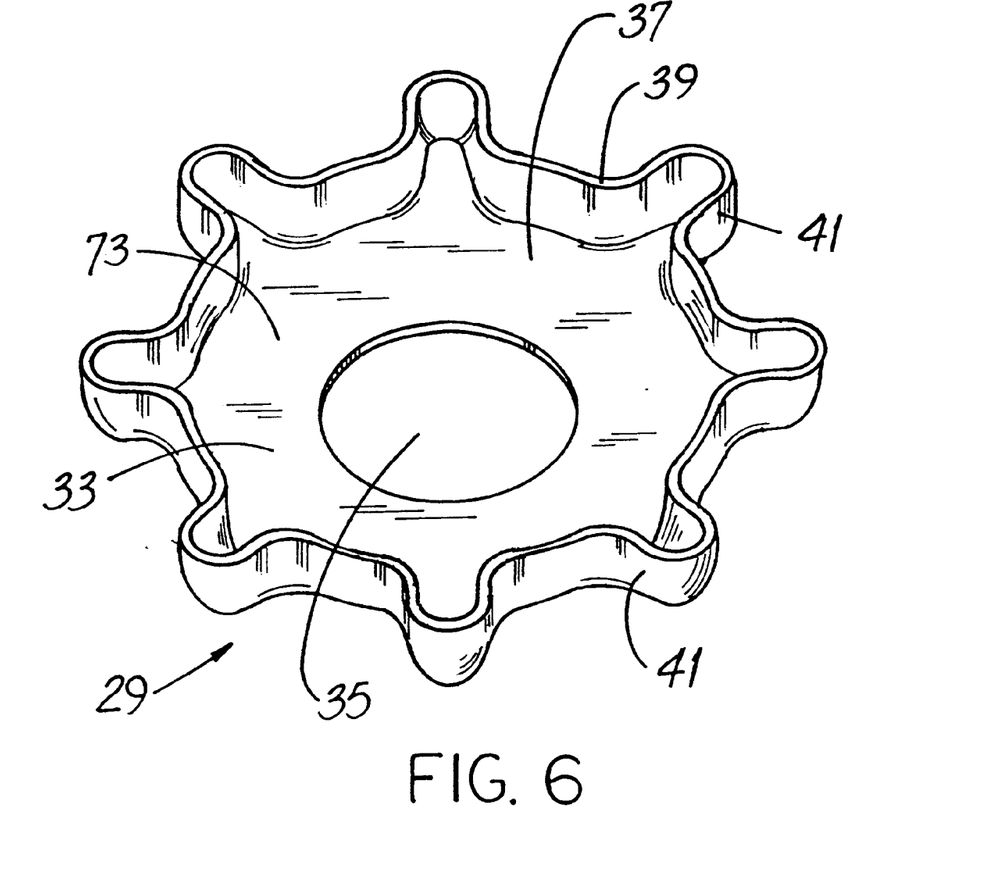
FIG. 6 is a perspective view of one of the components used to make the new coupling.

Referring next to FIGS. 2 through 6, the new power-transmitting coupling 10 includes a drive hub 25 having a central axis 27 and first and second coupling components 29, 31, respectively, mounted on the hub 25. In a highly preferred embodiment, the components 29, 31 are substantially identical to one another and one of them, e.g., component 29, is shown in FIG. 6. Each component 29, 31 is shaped to have a substantially planar body portion 33 with a central aperture 35. Each component 29, 31 is also shaped to have a concave interior cavity 37, an edge 39 around the cavity 37 and plural salients 41 extending radially outwardly. In a specific configuration, the number of salients 41 and the angle of spacing between adjacent pairs of salients 41 are, respectively, substantially equal to the number of fingers 21 and angle of spacing, e.g., 45° between fingers 21 of the transmission member 19.

Substantially all points along each component edge 39 are coincident with a plane 43 which is generally parallel to the body portion 33. When the components 29, 31 are attached to one another in edge-abutting relationship and when such components 29, 31 are also attached to the hub 25 (all shown in FIG. 4), the planes 43 defined by the edges 39 are substantially coincident with one another and substantially perpendicular to the central axis 27. And when the coupling 10 is used to transmit mechanical power, the axes 23 and 27 are coincident.

When the components 29, 31 are attached to one another and to the hub 25 to form the new coupling 10, the respective component salients 41 form radially-outwardly-extending projections 45, eight projections 45 in an exemplary embodiment. Each pair of projections 45 defines a notch 49 therebetween. The arc width AF of each finger 21 (about 5°) and the arc witdh AP of each projection 45 (about 8°) are each well less than the arc width AN of a notch 49 which is about 33°, all as measured from the axis of rotation 23 or the axis 27. The stated arc widths are exemplary; the arc widths of the fingers 21, the projections 45 and the notches 49 can vary considerably.

The new coupling 10 may be cooperatively configured with the transmission member 19 in such a way that the fingers 21 and projections 45 touch one another when such coupling 10 and member 19 are used for power transmission. However, in a highly preferred embodiment, a resilient ovoid device 53 (shown in FIGS. 2 and 7 and sometimes referred to as a "puck") is lodged between each finger 21 of the transmission member 19 and each projection 45 of the coupling 10 and contacts the TIG-applied weld material 55 described below. In that way, transmission of mechanical power from the transmission member 19 to the coupling 10 is cushioned when accelerating, running and retarding. To put it in other words, in a preferred embodiment there is no metal-to-metal contact between the transmission member 19 and the coupling 10.

Figure 7:
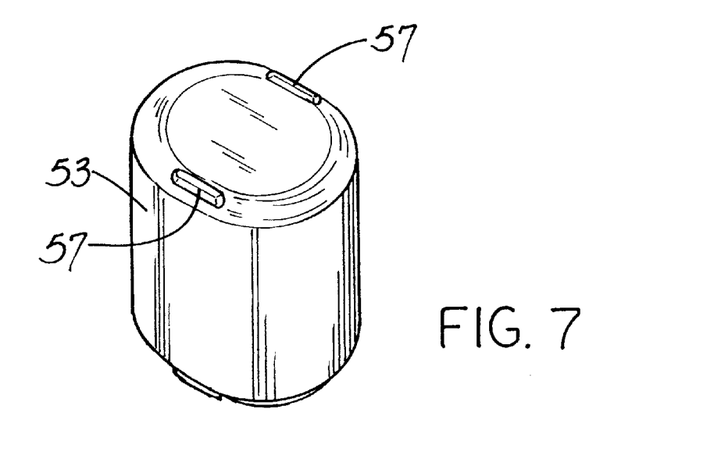
FIG. 7 is a perspective view of a resilient ovoid device used with the coupling and the transmission member shown in FIG. 2.

A specific ovoid device 53 has a marker 57 used as a visual aid to properly orient the device 53 with respect to the coupling 10 when the coupling 10, devices 53 and transmission member 19 are being assembled. In a specific arrangement, the marker 57 is a line molded or otherwise formed in the device 53. When the coupling 10 is assembled with the transmission member 19 and the devices 53 are in place, the marker 57 most closely adjacent to a projection 45 is substantially parallel to the side surface 59 of such projection 45.

The drive hub 25 is configured to have reduced-area (and in a specific embodiment, reduced-diameter) first and second guide portions 61, 63, one such portion 61 or 63 at each end of the hub 25. Each guide portion 61, 63 terminates in an annular shoulder 65, the surface of which is generally perpendicular to the axis 27. At least at the junction of a shoulder 65 and the respective guide portion 61 or 63, respectively, the guide portion 61, or 63 and the aperture 35 of the component 29 or 31 fitted to the hub 25 have substantially the same shape and area. In a highly preferred embodiment, such shape is a circle.

In a preferred hub 25, one guide portion 63 is axially longer than the other portion 61. Such extra length permits chucking the hub 25 for final machining to clean up any hub distortion which may have occurred during welding. And a preferred hub 25 also has a plurality of threaded holes 67 to which may be attached a coupling pulling tool when removing the coupling 10 from a shaft. While the exemplary hub 25 is of the tapered, keyed type, such hub 25 may also be configured to accept a straight keyed shaft, a spline shaft or the like.

The new method for making a power-transmitting coupling 10 includes the steps of forming first and second coupling components 29, 31. Preferably, such components 29, 31 are formed using a press which cuts a scalloped-edge flat blank, cuts the aperture 35 in the blank and forms the blank to its concave shape (shown in FIG. 6). As necessary, the edge 39 around the cavity 37 is machined flat and parallel to the body portion 33. That is, the edge 39 is finished to define a plane 43 substantially parallel to the body portion 33 of that component 29 or 31.

Each component 29, 31 resembles a "half shell" and such components 29, 31 may be used interchangeably when making the coupling 10. Unlike a coupling 10 of a known type, the new coupling 10 is hollow in that it has an interior chamber 69. And such new coupling 10 is significantly lighter than its predecessor.

The components 29, 31 are supported in edge-contacting relationship to one another and then joined to one another. The supporting step includes assembling the components 29, 31 to the drive hub 25. A separate guide portion 61 or 63 is inserted through each of the respective apertures 35 of the coupling components 29, 31 and such components 29, 31 are urged toward one another until their edges 39 contact one another and the respective hub shoulders 65.

Another aspect of the new method involves certain dimensional relationships. The hub shoulders 65 are spaced by a first dimension D1 as measured along or parallel to the hub central axis 27. As to each component 29 or 31, the interior surface 73 of its body portion 33 and the plane 43 defined by the component edge 39 are spaced by what is termed a "depth dimension" D2. In a preferred method, the first dimension D1 is substantially equal to the total of the depth dimensions D2 of the two half-shell components 29, 31. And in a highly preferred method, the depth dimensions D2 of the components 29, 31 are substantially equal to one another.

When the components 29, 31 are supported with respect to the hub 25 and in a relationship to one another such that the components 29, 31 contact one another at the edges 39, the edges 39 form a weld path 75. The joining step includes welding along the weld path 75 and in a more specific aspect, also includes welding the components 29, 31 to the drive hub 25 by applying circumferential welds at the locations 77, 79.

Preferably, disparate types of welding are used to weld along the weld path 75 (thereby joining the components 29, 31 to one another) and to weld the components 29, 31 to the drive hub 25. Welding along the weld path 75 is by tungsten inert gas (TIG) welding while welding the components 29, 31 to the drive hub 25 is by applying metal inert gas (MIG) welding at circular locations 77, 79.

Referring next to FIGS. 1, 8, 9 and 10, the drive assembly 83 is configured for coupling a driving mechanism, e.g., an internal combustion engine as the prime mover 13, and a driven mechanism, e.g., an electrical generator 11, to one another in a power-transmitting relationship. The assembly 83 includes an outer, ring-like transmission member 19 having a plurality of inwardly projecting fingers 21a, 21b, 21c extending from a drive ring 85. Each finger 21 is symmetrical about the radial 87 with which it is coincident and extends from a root 89 having curved sides 91. In a specific embodiment, the fingers 21 are circumferentially spaced 45° from one another.

Figure 10:
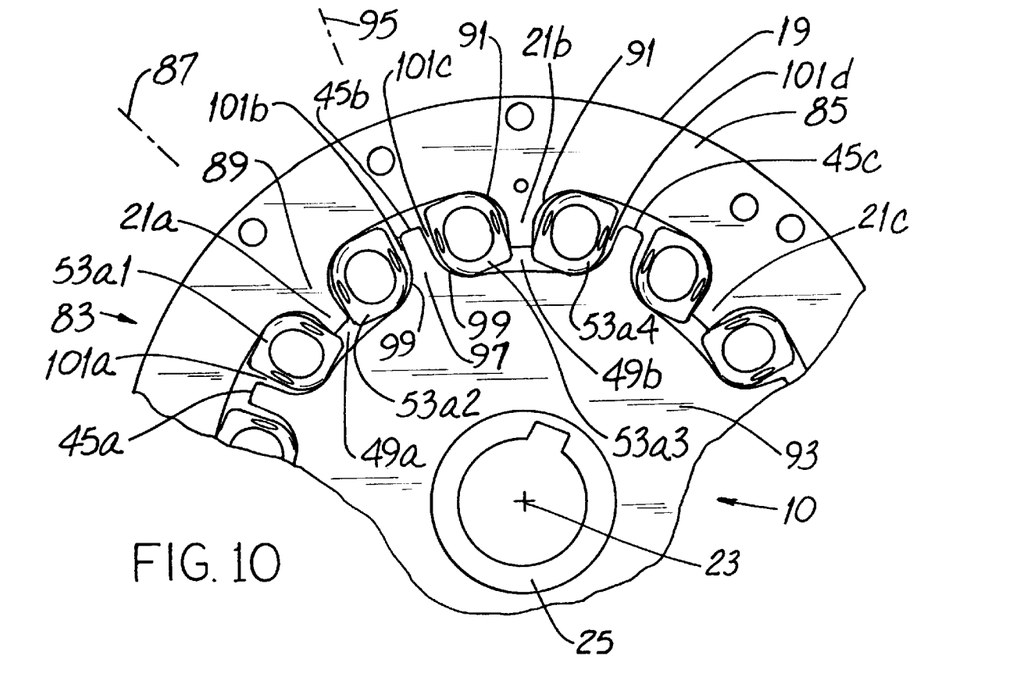
FIG. 10 is an axial view, generally like that of FIG. 2, of another embodiment of the drive assembly.

The assembly 83 also includes a star-wheel-like inner coupling 10 having a hub 25, a coupling body 93 around the hub 25 and a plurality of outwardly directed projections 45a, 45b extending from the body 93. Each projection 45 is symmetrical about the radial 95 with which it is coincident and extends from a root 97 having curved sides 99. In a specific embodiment, the projections 45 are also circumferentially spaced 45° from one another. And both the transmission member 19 and the coupling 10 rotate about the same axis of rotation 23.

From an inspection of FIG. 10, it will be seen that each pair of projections, e.g., first and second projections 45a, 45b, respectively, or second and third projections 45b, 45c, respectively, defines a notch between them such as first and second notches 49a, 49b, respectively. It will also be seen that the first and second fingers 21a, 21b, respectively, extend radially inwardly into the notches 49a, 49b, respectively.

Further, the first finger 21a and the first and second projections 45a, 45b define first and second pockets 101a, 101b, respectively. And the second finger 21b and the second and third projections 45b, 45c define third and fourth pockets 101c, 101d, respectively. Comparing FIGS. 2 and 10 with FIG. 8, each of the pockets 101 is shaped generally like the resilient device 53a. (As to axial dimensions, each finger 21 and projection 45 has a dimension generally designated D3 in FIG. 4 which is about equal to the axial length of the devices 53a, indicated as D4 in FIG. 9.)

Figure 8:
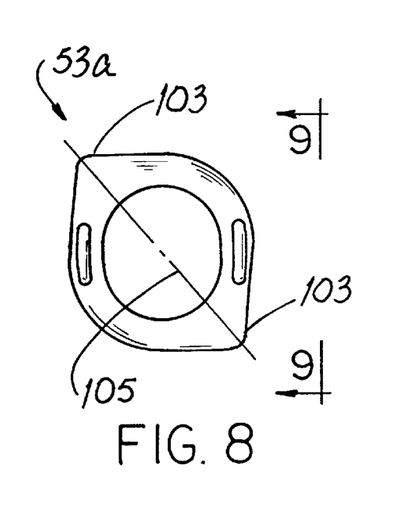
FIG. 8 is an axial view of one of the resilient devices used with the drive assembly of FIGS. 2 or 10.
Figure 9:
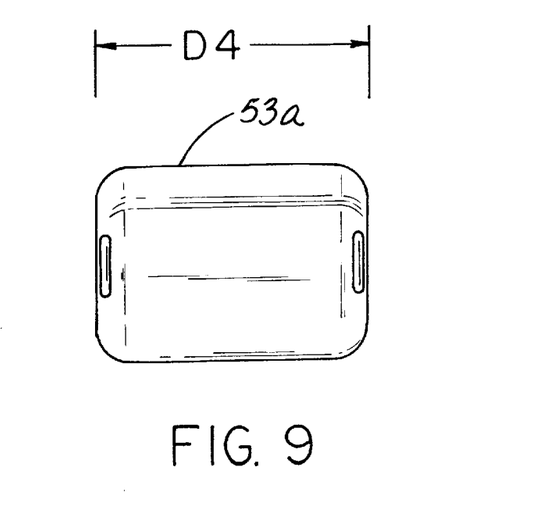
FIG. 9 is side elevation view of the resilient device of FIG. 8 taken along the viewing plane 9—9 thereof.

Referring particularly to FIGS. 8, 9 and 10, first and second resilient devices 53a1, 53a2, respectively, are received in the first and second pockets 101a, 101b, respectively. The first and second resilient devices 53a1, 53a2 are slightly ovoid in shape (see also FIG. 7) and each such device 53a includes at least one somewhat-pointed spur 103 projecting from it. In a highly preferred embodiment, each resilient device 53a includes a pair of spurs 103 projecting from it and measured along an axis 105 through the center point of the device 53a, the spurs 103 are about 180° apart. That is, the spurs 103 are coincident with such axis 105. The spurs 103 bear against the transmission member 19 or the coupling 10 and prevent substantial rotation of the first and second resilient devices 53a1, 53a2 in their respective pockets 101a, 101b. In a highly preferred embodiment, the first and second resilient devices 53a1, 53a2 are made of the same material. (Notwithstanding any suggestion to the contrary in FIG. 8, the devices 53a are solid, not hollow.)

Similarly, third and fourth resilient devices 53a3, 53a4, respectively, are received in the third and fourth pockets 101c, 101d, respectively. The third and fourth resilient devices 53a3, 53a4 are made of the same material but, preferably, such material is different from that used to make the first and second devices 53a1, 53a2.

For specific driving and driven mechanisms, the materials are selected from a group of materials consisting of natural rubber and nitrile Buna N. As identified in this specification and in FIG. 10, the preferred first material for the first and second devices 53a1, 53a2 is natural rubber and the preferred second material for the third and fourth devices 53a3, 53a4 is nitrile Buna N.

From the foregoing, it is (or should be) apparent that in the preferred construction, a particular inwardly directed finger 21 is bounded on both sides by resilient devices 53a made of the same material—either of those mentioned above—and the next adjacent finger 21 is bounded on both sides by resilient devices 53a made of the same material, the other of those materials mentioned above.

Considered another way, as to any one of the projections 45, the resilient devices 53 against each side thereof, e.g., devices 53a2, 53a3, are made of differing materials. And more specifically, the resilient devices 53 in the drive assembly 83 have substantially the same hardness. A preferred range of hardness is 60 to 80 Durometer and, most preferred, 70 plus or minus 5 Durometer.

While the principles of the invention have been shown and described in connection with a few preferred embodiments, it is to be understood clearly that such embodiments are by way of example and are not limiting.

What is claimed:

1. In a drive assembly for coupling a driving mechanism and a driven mechanism to one another and including a transmission to one another and including a transmission member having a plurality of inwardly projecting fingers and a coupling having a plurality of outwardly directed projections, and wherein:

the projections include first and second projections defining a notch therebetween;

one of the plurality of fingers extends into the notch, thereby forming first and second pockets between the one of the plurality of fingers and the first and second projections, respectively;

the improvement wherein:

first and second resilient devices are received in the first and second pockets, respectively; and the first and second resilient devices each resilient devices having a generally rectangular cross-section defining four corners wherein a first of the corners is rounded and wherein a first spur projects from a second of the corners so as to prevent substantial rotation of the first and second resilient devices in their respective pockets.

2. The drive assembly of claim 1 wherein each resilient drive includes a second spur projecting therefrom, the first and second spurs of each resilient device lying on a corresponding axis.

3. The drive assembly of claim 2 wherein one of the spurs of each resilient device bears against the transmission member.

4. The drive assembly of claim 3 wherein the first and second resilient devices are made of the same material.

5. The drive assembly of claim 4 wherein the material is selected from a group of materials consisting of natural rubber and nitrile Buna N.

6. In a drive assembly for coupling a driving mechanism and a driven mechanism to one another and including a transmission to one another and including a transmission member having a plurality of inwardly projecting fingers and a coupling having a plurality of outwardly directed projections, and wherein:

the projections include first and second projections defining a notch therebetween;

one of the plurality of fingers extends into the notch, thereby forming first and second pockets between the one of the plurality of fingers and the first and second projections, respectively;

the improvement wherein:

first and second resilient devices are received in the first and second pockets, respectively; and the first and second resilient devices each include at least one spur projecting therefrom, thereby preventing substantial rotation of the first and second resilient devices in their respective pockets; and wherein:

the notch is a first notch and the one finger is a first finger;

the projections include a third projection cooperating with the second projection and defining a second notch therebetween;

a second finger extends into the second notch, thereby forming third a fourth pockets between the second finger and the second and third projections, respectively;

third and fourth resilient devices are received in the third and fourth pockets, respectively;

the first and second resilient devices are made of a first material; and the third and fourth resilient devices are made of a second material.

7. The drive assembly of claim 6 wherein the first material is rubber.

8. The drive assembly of claim 6 wherein the first material is nitrile Buna N.

9. The drive assembly of claim 6 wherein the third and fourth resilient devices each include a pair of spurs projecting therefrom.

10. In a drive assembly for coupling a driving mechanism and a driven mechanism to one another and including a transmission member having a plurality of inwardly projecting fingers and a coupling having a plurality of outwardly directed projections, the improvement wherein:

the coupling includes first and second coupling components and is hollow;

one of the projections has a pair of sides;

a separate resilient device is against each side; and the resilient devices are made of differing materials.

11. The drive assembly of claim 10 wherein each resilient device includes a spur projecting therefrom, thereby preventing substantial rotation of each device with respect to the projection.

12. The drive assembly of claim 11 wherein each resilient device includes a pair of spurs projecting therefrom.

13. The drive assembly of claim 10 wherein the materials are selected for a group of materials consisting of rubber and nitrile Buna N.

14. The drive assembly of claim 10 wherein:

each of the projections has a pair of sides;

a separate resilient device is against each side of each projection; and as to any one of the projections, the resilient devices against each side thereof are made of differing materials.

15. The drive assembly of claim 14 wherein each of the resilient devices in the drive assembly have substantially the same hardness.

* * * * *

UNITED STATES PATENT AND TRADEMARK OFFICE
CERTIFICATE OF CORRECTION

PATENT NO. : 6,045,448

DATED : April 4, 2000

INVENTOR(S) : Robert D. Kern, Andrew B. Robson and Gerald C. Ruehlow

It is certified that error appears in the above-identified patent and that said Letters Patent is hereby corrected as shown below:

In Column 6, Line 19, insert --49-- before "between"

Signed and Sealed this

Twentieth Day of February, 2001

Attest:

NICHOLAS P. GODICI

Attesting Officer      Acting Director of the United States Patent and Trademark Office